United States Patent [19]

Hatfield

[11] Patent Number: 5,191,848
[45] Date of Patent: Mar. 9, 1993

[54] MULTIHULL VESSELS, INCLUDING CATAMARANS, WITH WAVE PIERCING HULL CONFIGURATION

[75] Inventor: Roger C. Hatfield, St. Croix, V.I.

[73] Assignee: Gold Coast Yachts, Inc., St. Croix, V.I.

[21] Appl. No.: 946,156

[22] Filed: Sep. 17, 1992

Related U.S. Application Data

[63] Continuation-in-part of Ser. No. 804,924, Dec. 11, 1991, abandoned.

[51] Int. Cl.$^5$ .......................... B63D 1/06; B63D 1/08; B63D 1/12
[52] U.S. Cl. ......................................... 114/56; 114/61
[58] Field of Search .................. 114/61, 56, 283, 252

[56] References Cited

U.S. PATENT DOCUMENTS

| | | | |
|---|---|---|---|
| D. 305,637 | 1/1990 | Emmer | D12/304 |
| D. 321,854 | 11/1991 | Foley et al. | D12/306 |
| 1,133,342 | 3/1915 | Ursinus | 114/292 |
| 3,090,974 | 5/1963 | Wozniak | 114/61 |
| 3,541,987 | 11/1970 | Barkley | 114/61 |
| 3,656,445 | 4/1972 | Padwick | 114/61 X |
| 3,665,885 | 5/1972 | Javes | 114/61 |
| 4,079,688 | 3/1978 | Diry | 114/56 |
| 4,811,676 | 3/1989 | Franke | 114/56 |

OTHER PUBLICATIONS

NKK Brochure on V-CAT (Publication date unknown) (Received from Japan on approximately Sep. 1, 1992).
"Ship & Boat International" Magazine-Mar. 1992, p. 23.
Article by Lindsay Lord, N. A. "The Tulleners Wave-Piercing Craft"-1976-Motor Boats, pp. 66-69.
Article-"The Shape of Things to Come" Sep. 1990-Marine Log, p. 22.

*Primary Examiner*—Sherman Basinger
*Attorney, Agent, or Firm*—Nies, Kurz, Bergert & Tamburro

[57] ABSTRACT

A catamaran vessel with a pair of spaced apart, parallel hulls which are made of sealed watertight configuration of composite marine material and interconnected by a deck and cabin structure with depending stilts joined to the hulls. The hulls have a wave piercing configuration in which the length to beam or fineness ratio of each hull is approximately 16.3:1 with a prow that is essentially knife-edged and vertical, the vertical section contours of the forward portion of the hull are elliptical and gradually transition to an essentially rectangular contour along the rear portion. The underside of the deck between the stilts has a convex undersurface which constitutes a planing hull structure above the top of the pair of hulls and between the stilts. The depicted vessel is power driven by motor-driven propellers at the stern of each hull. The specific hull configuration is a wave-piercing hull which can be combined in multihull ocean going vessels, such as proas (single main hull), catamarans (two hulls) and trimarans (three hulls).

20 Claims, 5 Drawing Sheets

MULTIHULL VESSELS, INCLUDING CATAMARANS, WITH WAVE PIERCING HULL CONFIGURATION

This application is a continuation-in-part of application Ser. No. 804,924, filed Dec. 11, 1991 and now abandoned.

This invention relates to improved multihull vessels, particularly powered catamarans, having a novel hull shape and configuration enabling smooth high speed passage of ocean waters with wave piercing capability.

BACKGROUND OF THE INVENTION

For many years it has been an objective of pleasure boat designers to provide a boat design with maximum motion comfort. Another way of expressing such comfort is provision of a smooth ride which avoids the pitching and rolling which occurs as the boat passes over waves. Higher speeds have been the nemesis of the smooth passage of boats through ocean waters particularly when experiencing steep peaks and valleys in waves. Improved hull shapes and configurations have been of primary consideration. Planing hulls, which are subject to slamming and rolling as the vessel passes over waves, are considered poor designs for comfort.

Past efforts to achieve motion comfort for small passenger vessels (up to 120 feet in length) have resulted in multihull boats and ships, such as catamarans, trimarans and proas. Recent configurations in multihull construction have achieved good stability and comfort particularly at lower speeds and not in high seas. Many designs for catamarans use conventional hull shapes. Some use torpedo shaped hulls which create problems related to fluid flow characteristics causing pitching on the surface. Other configurations use multihulls with plural over and under pontoons on each side with at least the lower pontoons being submerged. Boats with such submerged type hulls are termed SWATH type vessels.

The SWATH type vessels have at least two hulls, each with less than 50% buoyancy, which run completely submerged. Because these submerged hulls do not penetrate the surface they have generally been shaped with round cross-section, like torpedoes and nuclear submarines. Although they exhibit the most kindly of motions, they have several major compromises to consider. Swath hulls have greater construction surface area, challenging engine installation, and have greater structural requirements and primarily have limited speeds due to their inability to "read" the average surface level. Speed to length ratios (square root of waterline length in feet divided by speed in knots) much in excess of 3:1 require sophisticated stabilizing fins.

Examples of multihull vessels, boats or ships, with various hull shapes can be found in the following U.S. Pat. Nos.: Des. Pat. No. 274,237 to Stephen A. Edmonds for Catamaran; Des. Pat. No. 289,392 to Harold L. Gary et al for Sailboat; Des. Pat. No. 305,637 to David Emmer for Row Boat Hull; Des. Pat. No. 321,610 to W. R. Price, Jr. for Trimaran Sailboat; U.S. Pat. No. 2,666,406 to V. C. Babcock for Boat Hull; U.S. Pat. No. 3,177,836 to R. Salamin for Boat and Use Thereof; U.S. Pat. No. 3,447,502 to R. Leopold for Marine Vessel; U.S. Pat. No. 3,524,422 to R. B. Fuller for Watercraft; U.S. Pat. No. 3,541,987 to W. Barkley for Water Vehicle with Elevated Deck; U.S. Pat. No. 3,665,885 to A. Javes for Catamaran; U.S. Pat. No. 4,079,688 to G. L. Diry for Displacement Hull; U.S. Pat. No. 4,811,676 to P. Franke for Asymmetric Minimum Resistance Hull; and U.S. Pat. No. 4,870,919 to B. W. Allison for Catamaran Type Boat. None of the above patents teach a hull configuration like that of, nor are they capable of achieving the functional results of the present invention.

SUMMARY OF THE INVENTION

This invention relates to small ocean-going vessels for passenger and cargo transport and has as a primary objective the provision of maximum motion comfort with reasonable economic cost. Such objective is achieved by using a novel wave piercing hull configuration shape in a multihull vessel, and particularly in a catamaran motor driven boat. The desired maximum comfort is achieved by minimizing the surface contouring habits which are characteristics of conventional displacement and/or planing vessels. It is used in catamarans to achieve the required stability with the lowest possible buoyancy per hull. Safe marine practice dictates that either hull (plus some part of the stilt) should be able to support 100% of the craft's maximum displacement.

The wave piercing craft of the present invention is different from what has been developed in the prior art in at least two important concepts. The first and foremost consideration is hull shaping. At least the forward portion of a wave piercing hull must be able to both drop into waves and rise back out easily. Second in importance is a longer hull which always gives smoother rides. However, as the length to width ratio of a hull becomes greater, the advantages of smooth rides are offset by expensive construction problems, often including increased structure weight accompanied by reduced payload, and by loss of maneuverability and increased resistance to speed because of increased wetted surface area. Thus, hull shape and length of hulls are important factors in the present invention.

Accordingly a primary object of the present invention is to provide a novel smooth riding, ocean going multihull boat having a novel hull shape and capable of carrying passengers and/or cargo at a relative high-speed, i.e., a speed to length ratio in the range of between 3:1 to 6:1.

A very important and initial object of the invention in the hull is to use long thin hull sections that extend beyond the bridge deck, fore and aft, which aids in dampening of pitching and rolling.

A further object resides in the use of novel hulls which at the prow have a vertical essentially knife edge configuration with progressively changing sections from the prow, in the forward half of the hull and which are used in multihull types of vessels.

Still further objects reside in provision of such novel hulls arranged on streamlined vertically narrow wave-piercing stilts extending from an upper deck structure, which structure includes a contoured convex underbelly between the stilts and above the water level designed to help a diving vessel to climb back out of the dive.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

GENERAL DESCRIPTION

Referring now to FIGS. 1-5, a novel wave piercing catamaran 12 in accord with the present invention includes an above water combination hull and deck 14, including running boards 15 and 16, which also function as spray deflectors and dock rub rails, hulls 17 and 18 with struts or stilts 20 and 22 connecting between the respective hulls 17 and 18 and the deck 14 and a cabin 24, via the running boards 15 and 16. On the deck is a cabin 24, having a roof 25, with provision for 18 passengers, 2 crew members, and cargo. It has been determined from the test runs that, with the unique wave-piercing hull configuration, there is very little spray, even at high speeds.

Figure 1:
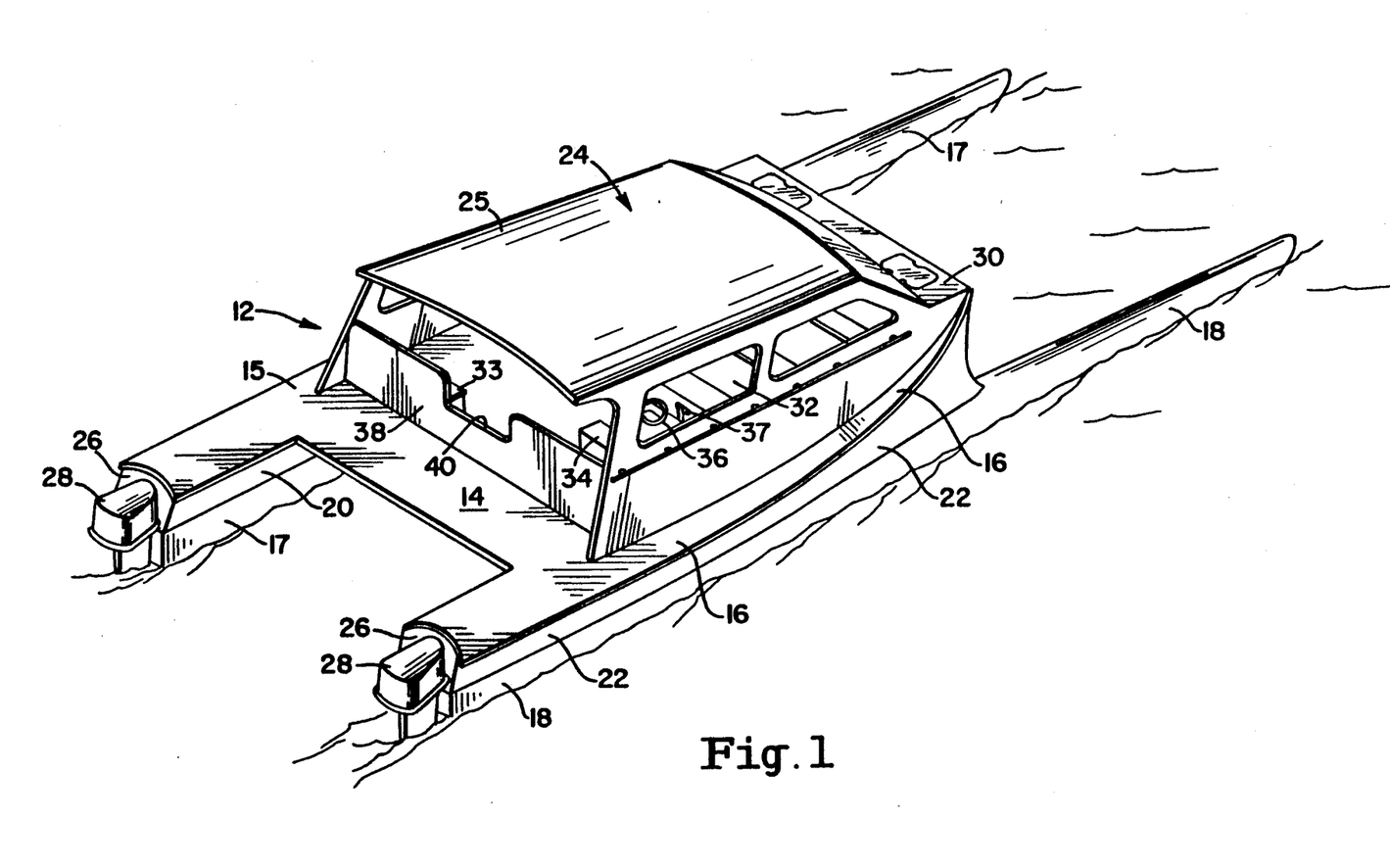
FIG. 1 is a rear quarter perspective view showing a wave piercing catamaran vessel incorporating the hull and deck structure of the present invention and including an outboard motor on each hull.

Each hull is identical and the combined stern portion 26 of each hull and associated strut has a concave contour and provides structural support for pivotally mounting an outboard motor 28. Between the front structural wall 29 of cabin 24, and up to the forward edge of the deck is a compartment 30 used as needed for fuel tanks and storage space for gear. In an operative embodiment the hulls are 38 feet (11.6 meters) long and the outboard motors are each 100 horsepower. While the disclosure shows outboard motors, inboard engines could be provided in the hulls and/or stilts, particularly in larger vessels, and if desired, the power source could be other forms of power which are well known to marine engineers.

In FIG. 1, the phantom vertical lines shown on the hull represent vertical hull stations, spaced-apart two feet, starting at the bow as station 0. The concave stern sections 26 are constructed by adding fairing structure at the aft end of each hull and strut or stilt.

Figure 2:
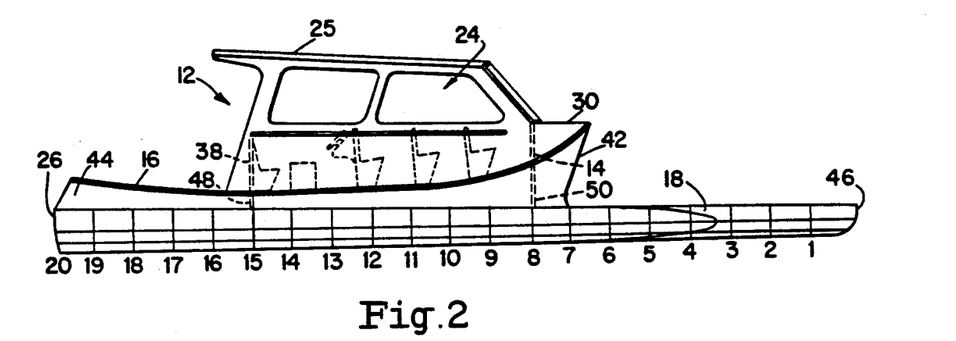
FIG. 2 is a side elevation view of the wave piercing catamaran shown in FIG. 1.

In FIG. 2, the curvature of the deck and running board is illustrated and shows a curved hull underside portion of the deck, located between the stilts 20 and 22, which serves as a center hull section shaped with a convex planing contour to help force the vessel back up should it go down into a wave.

Figure 3:
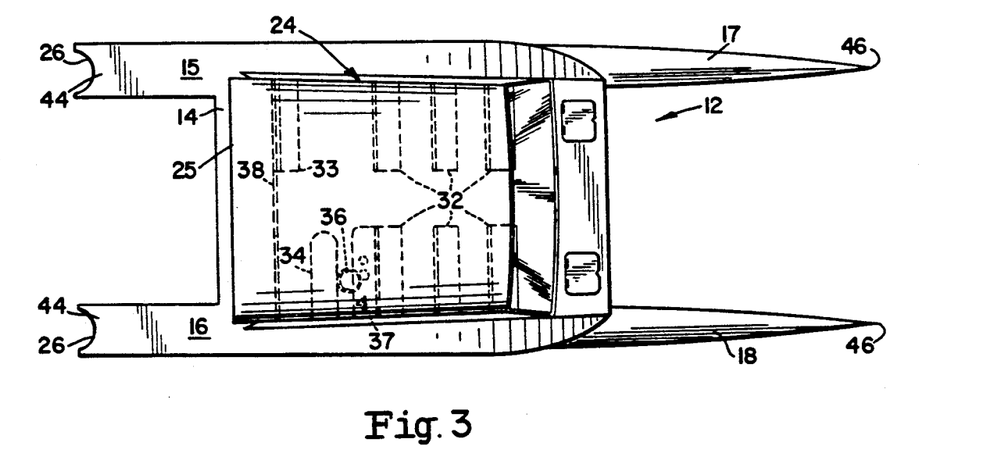
FIG. 3 is a top plan view of the catamaran shown in FIG. 2.

FIG. 3 shows the interior space of the cabin 24 (the roof 25 being removed) with one possible arrangement of six (6) benches 32, each bench providing three (3) seats, for 18 passengers, and a bench 33 for two (2) crew members. The captains station includes a bench 34 and the steering and engine controls 36 and 37. Forward of the crew station 33 is space for cargo. Seen in FIG. 1, a low rear wall 38 of the cabin has a cutout center portion to provide an access opening 40 into the cabin The configuration shown in FIGS. 1-5 is for a 38 foot Water Taxi passenger version which has been produced and satisfactorily operated in the ocean. It has a 14' beam and an empty or lightship weight of 5022 pounds. Thereby, the length to beam ratio of the disclosed Water Taxi version of a vessel constructed in accord with this invention is approximately 2.7 to 1. A typical total vessel load for 50% displacement of each hull is approximately 7300 pounds and full load is 9440 pounds. See the hull displacement notations on FIG. 6.

The front wall 29 and rear wall 38 of the cabin structure are structural beams, desirably made from modern light weight composite marine structure, e.g., laminated glass and epoxy, being high strength vertically flat beams with depending legs 48,50, at each end of the beams, which extend down through the stilts and structurally connect with bulkheads in the hulls to integrally join the hulls and the cabin and bridge deck.

Figure 5:
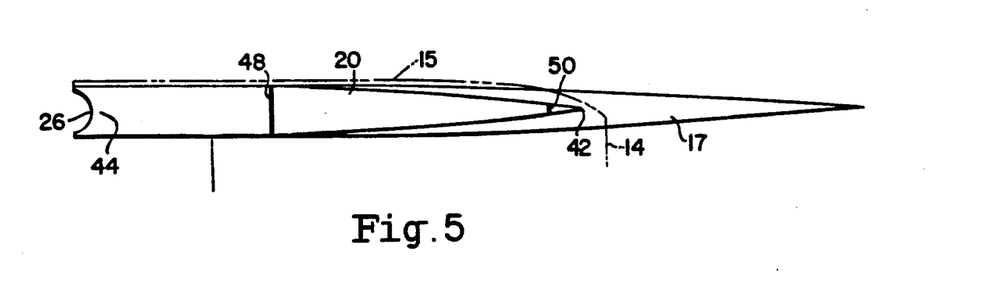
FIG. 5 is a detail plan view of the left hull and strut or stilt of the vessel shown in FIG. 3 with the running board of the deck shown in phantom lines.

FIG. 5 illustrates the shape of the left stilt 20 positioned over the left hull 17 and under the left running board 15 of the deck. The strut is narrow, streamlined similar to the hulls, is hollow and made of suitable marine construction and can be made watertight as desired. Seen in FIG. 2, the projection of the hull, forward of the junction of the front edge of the streamlined strut with the upper surface of the hull is approximately 36% of the hull length in the vessel as constructed, however for larger vessels the forward projection can be a smaller portion of the hull length. Preferably the forward projection of the hull from the aforementioned junction can be at least approximately 20 percent of the hull length, particularly in larger vessels. Its front end is substantially knife-edged as indicated at 42 and its rear contoured end is essentially rectangular as indicated at 44.

The hulls 17 and 18 can be pressure formed in a monocoque construction, e.g., made from known modern lightweight composite system, e.g., cedar strip planking placed lengthwise, to form the hull shape, with transverse glass fibers laminated with epoxy, or laminated marine plywood which can be covered, outside and/or inside with epoxy impregnated fiber glass cloth. The hulls are sealed and are waterproof. They should be provided with watertight compartments in a well-known manner to provide safety buoyancy as required by the U.S. Coast Guard.

The lines numbered from station number 1 to 19 on the hull of FIG. 2, and also seen in FIG. 1, are 2 foot station lines. As has been previously stated the foremost consideration in the new wave-piercing hull is its shape vertically and longitudinally as it just be able to pass through the water with minimum turbulence and to enable its forward portions to both drop into waves and rise back out easily with minimum drag. It has been found that using elliptical sections similar in vertical section to airfoil sections on the forward part of the hull (from $\frac{1}{8}$ to $\frac{1}{2}$ the length) with a minimum average height to width ratio of 2:1 (and even greater, i.e., essentially knife edge as one approaches the bow) will produce the required low hydrodynamic drag form desired, in both directions as the bow drops into and rises as well as passes through the waves. As stated, the prow 46 of each hull 17, 18, is essentially vertically and essentially knife-edged, although structural construction technique results in a small round edge contour.

Forward hull sections, as have been previously proposed in prior art hull shapes, which are rounds, vees and diamonds, are self-defeating for smooth and comfortable rides due to their resistance to vertical accelerations in pitching movements in the water. Vee shapes, in particular, are known to shovel into the seas and have difficulty lifting back to the surface. The end result of use of the vertically elliptical sections of the present invention is minimum water plane area along the forward portion of the hull. Decreased water plane area is known to produce smoother rides, it decreases pancaking and slamming of the hull as it rides the waves. The present hull pierces the waves horizontally and vertically and remains relatively steady.

Figure 6:
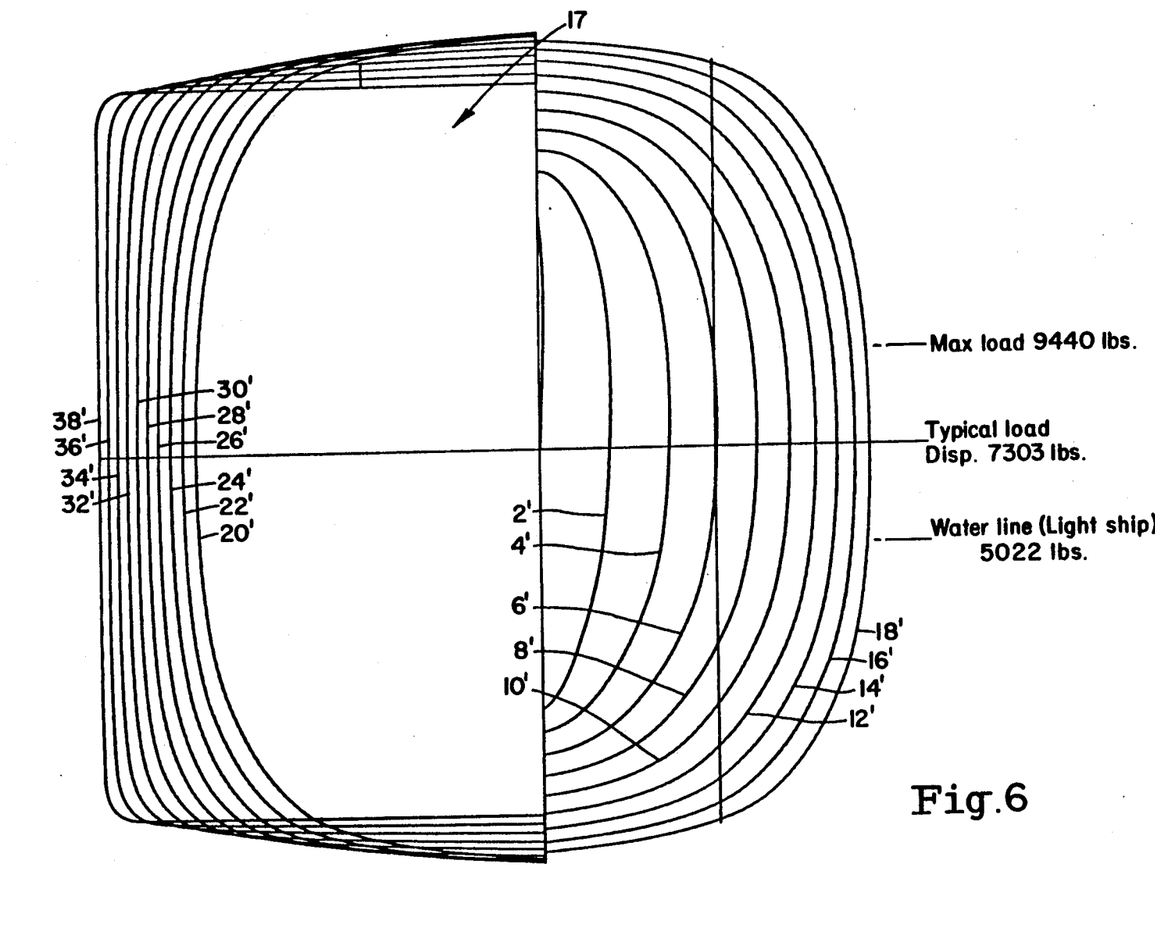
FIG. 6 is an enlarged composite detail scale drawing of the FINAL SECTION LINES of one of the hulls, the right hand side showing the forward half contour and the left hand side showing the rearward half contours.

Referring to FIG. 6 the hull section contours are shown. The sections are drawn to scale and on the original patent drawing sheets ($8\frac{1}{2}"\times 14"$) the scale is 3":1'. The maximum beam of each hull is 2' 4". In FIG. 6, the right side section contours show the vertically elliptical forward shape of the hull from station 0 to station 18, marked in feet, while the left side section contours show the progressive shape of the aft part of the hull from station 20 to station 38, marked in feet, as it transitions from elliptical to a substantially rectangular or almost squared section at the stern. The length to beam or fineness ratio of each hull of the vessel which has been made is approximately 16.3:1. In a vessel built with two sealed hulls dimensioned as noted above, and with respect to FIG. 6, the weight of the typical loaded vessel is 7303 pounds and the weight of the maximum loaded vessel is 9440 pounds, see FIG. 6. The total displacement of each hull is desirably not more than 90% to 100% of the total weight of the loaded vessel. This will provide good stability and comfort and will comply with safe marine practice.

It has been previously noted herein that longer hulls always give smoother rides. Hulls approaching fineness ratios of 30:1 become questionable compromises to production simplicity, maneuverability, slow speed resistance and structural and skin weight to payload considerations. Hull length to beam ratios within a range of from approximately 15:1 to approximately 30:1 have been found to be efficient for minimum running resistance. The favorable wave piercing benefits of the hull configuration in accord with the present invention can be obtained by using a hull length to beam ratio (fineness ratio) falling within a range of approximately 12:1 to approximately 30:1 and preferably having a fineness ratio between 14:1 and 17:1. Hulls of these proportions have low reserve buoyancy. Hence they need a fair amount of bow and some stern protrusion beyond the vessel bridge-deck superstructure. Viewed differently, the limited payload capacity of these low buoyancy hull shapes dictate smaller lighter superstructures. Such superstructures may be roughly 50–60% of the hull length located over a center of gravity, C.G., of 50–65% aft of the bow station 0. Technically, by maximizing the longitudinal waterplane moment of inertia, the hull shapes of this invention have dampened pitching accelerations. And even though the longitudinal mass radius of gyration is low, the vessels of this invention run a reduced risk of a major pitch pole (with the resulting slam) by allowing the hydrodynamic shapes to average out and dampen the effect of the waves.

Figure 4:
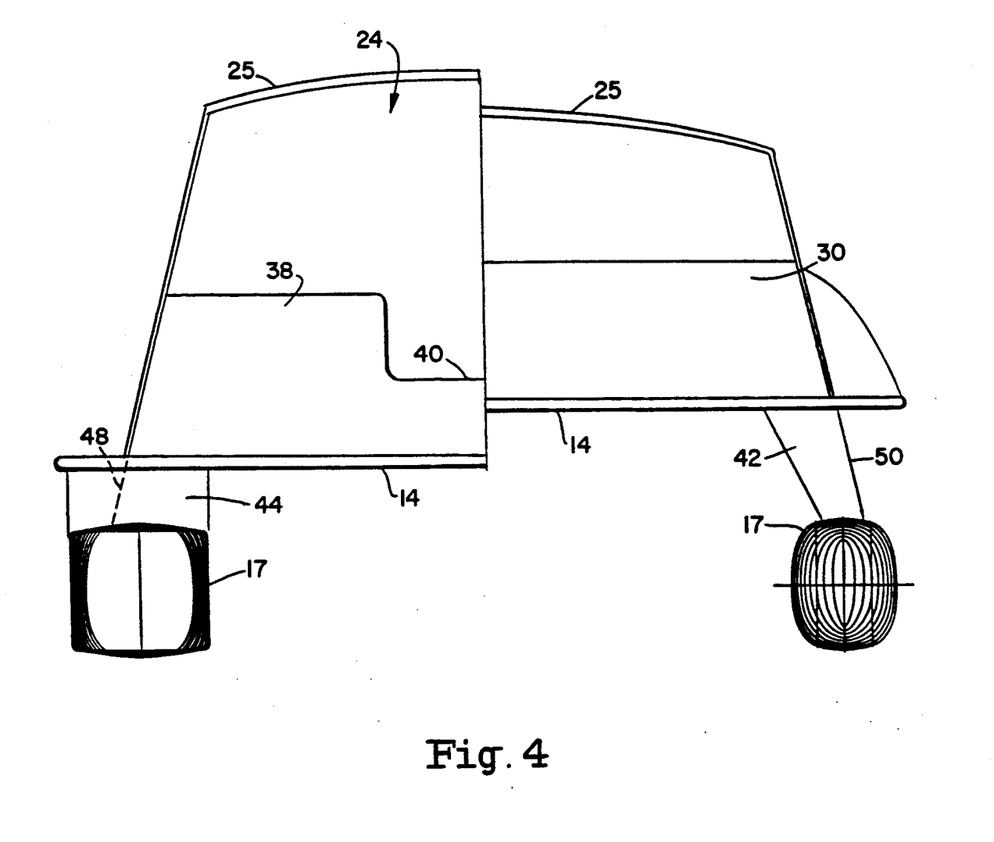
FIG. 4 is a composite front and rear sectional elevation view of the catamaran shown in FIGS. 2 and 3, the left portion being the rear view and the right portion being the front view and including a detail front elevation scale drawing of the FINAL SECTION LINES of the left hull of the vessel, the right hull being identical.

FIG. 4 is a true scale drawing and shows the actual relative spacing between the hulls of the vessel shown in FIGS. 1-3. The original patent drawing ($8\frac{1}{2}"\times 14"$) was drawn from the FINAL LINES of a production 38 foot catamaran.

Figure 7:
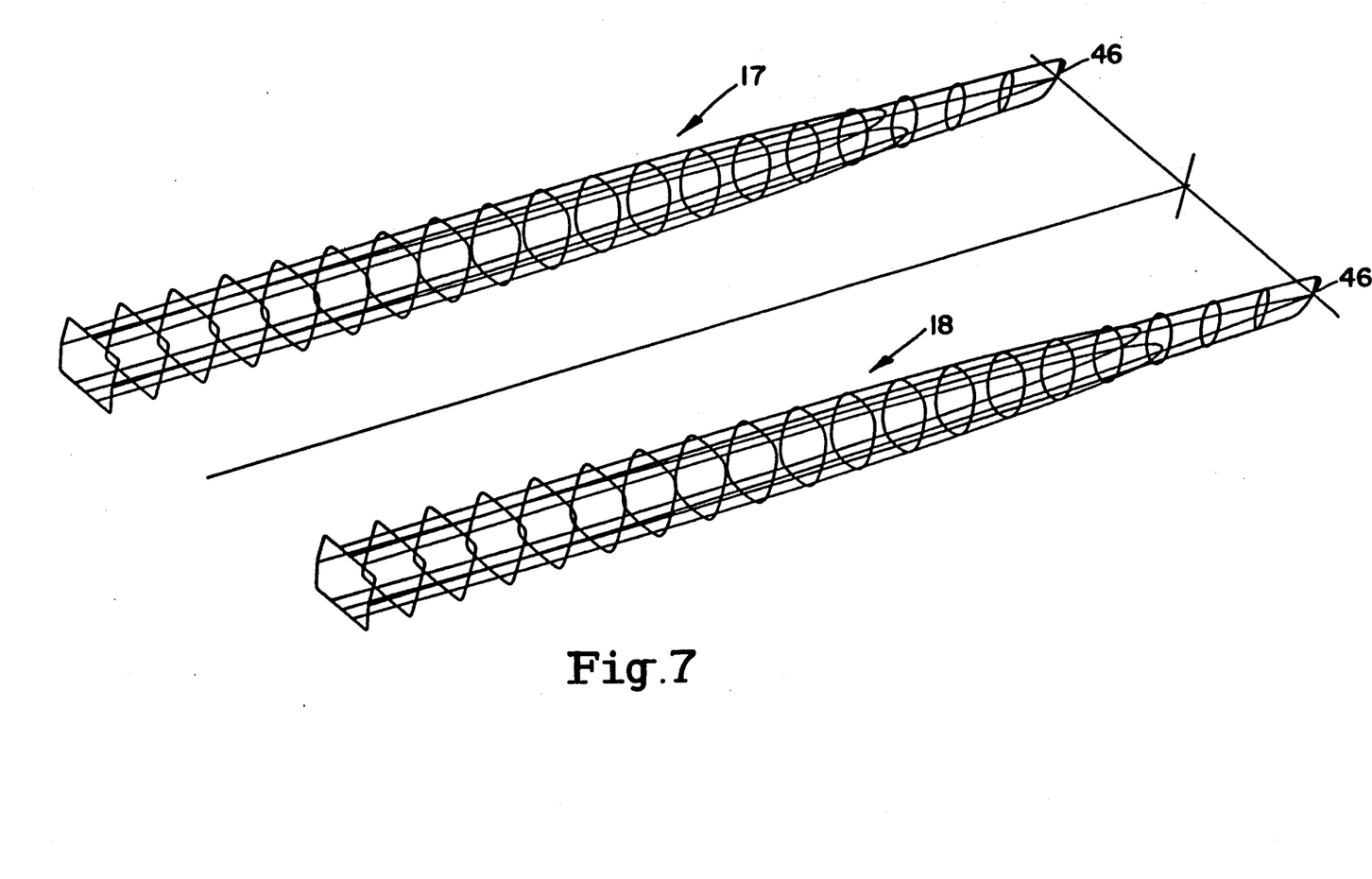
FIG. 7 is a perspective drawing of the FINAL LINES of the two spaced apart hulls of the vessel of FIGS. 2 and 3 substantially but not exactly to scale.

FIG. 7 is a perspective FINAL LINE depiction of the two hulls of the vessel of FIGS. 1-4 and are substantially but not precisely to scale. They are intended to illustrate the approximate relative spacing and disposition of the two hulls and provide a clear depiction of the wave piercing configuration of each hull, both vertically and longitudinally.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An ocean going vessel comprising: at least a pair of laterally spaced apart parallel long thin hulls, a connecting means, including stilt means connected to each hull, connecting said spaced apart hulls and means for driving said vessel through the water; at least one of said hulls comprising: a buoyant, sealed and watertight wave piercing hull configuration, with the length to beam ratio of said hull being within the range of from about 12:1 to about 30:1; said hull having a prow which is substantially knife-edged and vertical; the vertical section contours of the forward $\frac{1}{8}$ to $\frac{1}{2}$ portion of the length of the hull are of progressively varying elliptical shape from said prow and have a height to width ratio which averages essentially 2:1 between the prow and the rearward section of the elliptical portion of the hull; and the sections of the rearward portion of the hull are shaped to transition from the rearmost elliptical section of the forward portion of the hull to a substantially polygonal section contour adjacent the stern of said hull.

2. An ocean going vessel as defined in claim 1, comprising at least two long thin hulls both of which are configured as said wave piercing hull configuration and said stilt means of said connecting structure are substantially vertical and comprise wave piercing streamlined struts connecting to each hull, said connecting structure includes a bridge deck with a convex undersurface connecting said stilts and constituting a planing hull structure spaced above the top of and between said pair of hulls; and said hulls extend at least forward beyond the bridge deck.

3. A vessel as defined in claim 2, wherein the construction of each hull results in the total displacement of each hull when submerged to its upper surface, the hull to stilt means junction, being not more than 90% to 100% of the total weight of the loaded vessel.

4. An ocean going vessel as defined in claim 2, said means for driving said vessel comprising an outboard motor pivotally mounted at the stern of each hull and its associated said stilt means.

5. A vessel as defined in claim 2, wherein the length to beam ratio of each hull is identical; each hull is approximately 38 feet in length; the forward ½ of said hulls have said elliptical section contours; and the deck structure has a length between 50-60 percent of the hull length and is located so the center of gravity is between 50-65% aft from the prow of the hull.

6. A vessel as defined in claim 2, including a cabin structure on said deck, said vessel having a length to beam ratio of approximately 2.7:1 and wherein the length to beam ratio of each hull is approximately 16.3:1; each hull is approximately 38 feet in length; the forward ½ of said hulls have said vertically elliptical section contours; and the deck structure has a length between 50-60 percent of the hull length and is located so the center of gravity of said vessel is 50-65% aft from the prows of the hulls.

7. A vessel as defined in claim 2, wherein the fineness ratio of each hull is in the range of from about 15:1 to about 30:1 and the hull configurations provide a speed to length ratio which can be in the range of between 3:1 to 6:1.

8. A vessel as defined in claim 12, wherein each of said wave piercing struts has a leading edge which has a junction where the strut is joined to its associated hull and the portion of the associated hull forward of said junction is at least approximately 20% of the total length of the hull.

9. A vessel as defined in claim 8, wherein the portion of each hull which is forward of its said junction with the leading edge of the associated strut is approximately 36% of the total length of the hull.

10. A vessel as defined in claim 2, wherein said hulls extend both fore and aft beyond the bridge deck.

11. An ocean going vessel as defined in claim 1, wherein the length to beam ratio of said hull is within the range of from 15:1 to 30.1.

12. A buoyant sealed and watertight wave piercing hull for use in multihull boats, comprising: a hull configuration in which the length to beam ratio is within the range of from about 12:1 to about 30:1; the hull has a prow which is substantially knife-edged and vertical; the vertical section contours of the forward ⅛ to ½ portion of the length of the hull are elliptical and progressively vary from said substantially knife shaped prow with a height to width ratio which averages essentially 2:1 between the prow and the rearward section of the elliptical portion of the hull; and the sections of the rearward portion of the hull are shaped to transition from the rearmost elliptical section of the forward portion of the hull to a substantially polygonal section contour adjacent the stern of said hull.

13. A wave piercing sealed and watertight hull as defined in claim 12, including internal watertight compartments with structural walls enabling means to structurally interconnect said hull with stilt means for securing said hull to a bridge and deck structure for a boat.

14. A wave piercing sealed and watertight hull as defined in claim 13, further including said stilt means, and said stilt means comprises structural beam parts and a substantially vertical wave piercing streamlined means connecting to the hull structure.

15. A wave piercing watertight hull and stilt means as defined in claim 14, wherein said streamlined means is hollow and both of the hull and the streamlined means are made of watertight marine construction.

16. A wave piercing hull as defined in claim 14, wherein said substantially vertical wave piercing streamline means is a streamlined strut with a leading edge which has a junction where the strut joins the hull and the portion of the hull projecting forward of the junction is at least approximately 20% of the total hull length.

17. A wave piercing hull as defined in claim 16, wherein the portion of the hull projecting forward from said junction with the leading edge of the streamlined strut is approximately 36% of the total length of the hull.

18. A wave piercing sealed and watertight hull as defined in claim 12, having a configuration wherein the vertical contours of the forward portion have a hydrofoil configuration which enables the forward portion of the hull to drop into a wave and rise back out with minimum disturbance to laminar flow of the water past the forward portion of the hull.

19. A wave piercing sealed and watertight hull as defined in claim 12, wherein the configuration provided a speed to length ratio in the range of between 3:1 and 6:1.

20. A wave piercing hull as defined in claim 12, wherein the length to beam ratio of said hull is within the range of from 15:1 to 30:1.

* * * * *

UNITED STATES PATENT AND TRADEMARK OFFICE
CERTIFICATE OF CORRECTION

PATENT NO. : 5,191,848
DATED : March 9, 1993
INVENTOR(S) : ROGER C. HATFIELD

It is certified that error appears in the above-identified patent and that said Letters Patent is hereby corrected as shown below:

Column 7, line 23 (Claim 8, line 1) the number "12" should be --2--.

Column 8, line 41 (Claim 19, line 2) "provided" should be --provides--.

Signed and Sealed this

Thirtieth Day of November, 1993

Attest:

BRUCE LEHMAN

Attesting Officer

Commissioner of Patents and Trademarks